US011022060B2

(12) United States Patent
Ward et al.

(10) Patent No.: US 11,022,060 B2
(45) Date of Patent: Jun. 1, 2021

(54) DIAGNOSTIC SYSTEMS AND METHODS FOR ISOLATING FAILURE MODES OF A VEHICLE

(71) Applicant: Cummins Inc., Columbus, IN (US)

(72) Inventors: Jason Ward, Greenwood, IN (US); Krithika Mohan, Columbus, IN (US)

(73) Assignee: Cummins Inc., Columbus, IN (US)

(*) Notice: Subject to any disclaimer, the term of this patent is extended or adjusted under 35 U.S.C. 154(b) by 10 days.

(21) Appl. No.: 16/620,200

(22) PCT Filed: Jun. 8, 2017

(86) PCT No.: PCT/US2017/036546
§ 371 (c)(1),
(2) Date: Dec. 6, 2019

(87) PCT Pub. No.: WO2018/226234
PCT Pub. Date: Dec. 13, 2018

(65) Prior Publication Data
US 2021/0079865 A1 Mar. 18, 2021

(51) Int. Cl.
F02D 41/22 (2006.01)
G07C 5/08 (2006.01)
(Continued)

(52) U.S. Cl.
CPC .......... *F02D 41/221* (2013.01); *F02B 37/16* (2013.01); *G05B 23/0275* (2013.01);
(Continued)

(58) Field of Classification Search
CPC .......... F02D 41/221; F02D 2041/227; F02D 2041/228; F02B 37/16; G05B 19/0428;
(Continued)

(56) References Cited

U.S. PATENT DOCUMENTS 5,150,695 A * 9/1992 Kondo ............. F02D 41/221
123/568.16
6,112,150 A 8/2000 Irons et al.
(Continued)

FOREIGN PATENT DOCUMENTS

DE 102004036064 A1 3/2006
DE 102015120977 A1 6/2016
EP 2489850 A1 8/2012

OTHER PUBLICATIONS

International Search Report and Written Opinion issued by the ISA/US, Commissioner for Patents, dated Aug. 21, 2017, for International Application No. PCT/US2017/036546; 6 pages.
(Continued)

*Primary Examiner* — George C Jin
(74) *Attorney, Agent, or Firm* — Faegre Drinker Biddle & Reath LLP

(57) ABSTRACT

A system includes a controller having a control signal generation unit that provides control signals to actuate one or more valve actuators of an engine to a desired position, and control signals to modify one or more operational parameters and an operational mode of the engine. A parameter signal process unit receives parameter signals corresponding to at least one operational parameter of the engine, and at least one sensor coupled to the engine. At least one sensor corresponds to a position of a valve. A failure detection unit generates at least one fault code corresponding to one or more failure modes. A failure mode isolation unit isolates a failure mode from the one or more failure modes in response to modifying the operational parameters or the operational mode, causing actuation of the valves to a desired position, or receiving the parameter signals and the sensor.

28 Claims, 5 Drawing Sheets

(51) Int. Cl.
*F02B 37/16* (2006.01)
*G05B 23/02* (2006.01)
*G01M 15/05* (2006.01)

(52) U.S. Cl.
CPC ....... *G05B 23/0289* (2013.01); *G07C 5/0808* (2013.01); *G07C 5/0825* (2013.01); F02D 2041/227 (2013.01); F02D 2041/228 (2013.01); F02D 2200/101 (2013.01); G01M 15/05 (2013.01)

(58) Field of Classification Search
CPC ............ G05B 23/0428; G05B 23/0275; G05B 23/0289; G05B 23/0262; G07C 5/0808; G07C 5/0825
See application file for complete search history.

(56) References Cited

U.S. PATENT DOCUMENTS

| | | | |
|---|---|---|---|
| 6,497,227 B2 | 12/2002 | Wang et al. | |
| 6,687,601 B2 | 2/2004 | Bale et al. | |
| 6,952,658 B2 | 10/2005 | Greulich et al. | |
| 7,246,265 B2 | 7/2007 | Vollmar et al. | |
| 7,631,552 B2 | 12/2009 | Keski-Hynnila et al. | |
| 8,271,233 B2 | 9/2012 | Butler | |
| 8,423,226 B2 | 4/2013 | Underdal et al. | |
| 8,648,700 B2 | 2/2014 | Gilbert | |
| 2007/0288134 A1 | 12/2007 | Rollinger et al. | |
| 2010/0082197 A1 | 4/2010 | Kolbet et al. | |
| 2011/0118932 A1 | 5/2011 | Singh et al. | |
| 2011/0276213 A1* | 11/2011 | Tomatsuri | F02D 41/021 701/22 |
| 2012/0210710 A1* | 8/2012 | Chevalier | F02D 41/221 60/602 |
| 2012/0210711 A1* | 8/2012 | Petrovic | F02B 37/18 60/602 |
| 2013/0030641 A1 | 1/2013 | Olsen, III et al. | |
| 2013/0211693 A1* | 8/2013 | Petrovic | F02B 37/013 701/104 |
| 2017/0051654 A1 | 2/2017 | Gupta et al. | |

OTHER PUBLICATIONS

International Preliminary Report on Patentability received for PCT Patent Application No. PCT/US2017/036546, dated Dec. 19, 2019, 6 pages.

* cited by examiner

DIAGNOSTIC SYSTEMS AND METHODS FOR ISOLATING FAILURE MODES OF A VEHICLE

CROSS-REFERENCE TO RELATED APPLICATIONS

This application is a U.S. national stage filing of PCT/US2017/036546, filed Jun. 8, 2017, the entire disclosure of which is hereby expressly incorporated by reference herein in its entirety.

FIELD OF THE DISCLOSURE

The present disclosure generally relates to diagnostic systems for internal combustion engines, and more specifically to a fault isolation test that includes controlling the engine in a unique manner during a service event to allow for identification of one or more failed components of an internal combustion engine.

BACKGROUND OF THE DISCLOSURE

Systems for diagnosing engine components based strictly on the behavior of such components are known and have been implemented extensively in the automotive and diesel engine industries. However, with such conventional diagnostic approaches, it is difficult to diagnose some fault conditions associated with electrically actuatable control mechanisms.

For example, a control system coupled to an internal combustion engine includes a control mechanism having an actuator responsive to an actuator command to control the mechanism to a specified position, and a position sensor producing a signal indicative of a position of the mechanism relative to a reference position. Using conventional diagnostic techniques, the sensor signal is typically analyzed to determine the overall operability of the mechanism and/or to determine fault conditions associated with the sensor itself. However, fault conditions and/or failure modes may occur with respect to the actuator and/or the mechanism itself that are undetectable via analysis of the sensor signal alone. As one specific example, the signal produced by a control valve position sensor may indicate that the valve is moving and operating normally even though a failure condition exists that prevents the valve from forming a proper seal with a valve-sealing surface.

Accordingly, it is desirable to develop a component diagnostic system that includes a fault isolation methodology that allows for the identification of a failed component or a particular failure mode based on one or more fault codes generated by the control unit of an internal combustion engine.

SUMMARY OF THE DISCLOSURE

In one embodiment of the present disclosure, a method includes generating, by a controller, at least one fault code corresponding to one or more failure modes; modifying, by the controller, a mode of operation of an engine in response to the generated at least one fault code; actuating, by the controller, one or more valve actuators of the engine to a desired position in response to the generated at least one of fault code; receiving, by the controller, at least one parameter value corresponding to one or more operational parameters of the engine in response to the generated at least one of fault code; receiving, by the controller, data provided by at least one sensor positioned within the engine in response to the generated at least one of fault code; and isolating, by the controller, a failure mode from the one or more failure modes in response to at least one of: modifying the mode of operation of the engine, actuating one or more valve actuators, receiving the at least one parameter value, and receiving the data provided by at least one sensor.

In one example, generating at least one fault code includes generating one of: a turbo speed fault code, a charge pressure fault code, an inter-stage pressure fault code, a compressor by-pass valve stuck open fault code, and a compressor by-pass valve stuck closed fault code. The one or more failure modes include: a turbo speed sensor in-range failure mode, an inter-stage pressure sensor (e.g., in-range) failure mode, a charge pressure sensor in-range failure mode, a high speed turbo (e.g., speed sensor in-range) failure mode, a high pressure turbo failure mode and a compressor by-pass valve efficiency (e.g., stuck open, stuck close or partially open/close) failure mode. Modifying a mode of operation of an engine includes operating the engine in a normal mode and then operating the engine in an abnormal mode. The method further includes modifying at least one operational parameter of the engine in response to the generated at least one fault code, wherein the engine is an internal combustion engine and modifying at least one operational parameter of the engine includes modifying an engine speed of the internal combustion engine.

In one example, the method includes receiving data provided by the at least one sensor in response to a compressor by-pass valve ("CBV") being moved to an opened position and receiving data provided by the at least one sensor in response to the CBV being moved to a closed position. Modifying at least one operational parameter of the engine includes increasing the engine speed from a first engine speed to a second engine speed. In another example, the method first overrides other air handling actuators to a specific position. For example, the EGR and EGR bypass actuator are overridden to a close position. The air flow command to the air handling controller is overridden to a certain flow, and the turbine bypass valve or a VGT is overridden to a fixed partially closed position. This is performed to isolate the intake system from any EGR or exhaust system failures. The method further includes receiving data provided by the at least one sensor when the engine speed is the first engine speed and the CBV is in (e.g., is overridden to) the opened position, and receiving data provided by the at least one sensor when the engine speed is the first engine speed and the CBV is in (e.g., is overridden to) the closed position. The method further includes receiving data provided by the at least one sensor when the engine speed is the second engine speed and the CBV is in (e.g., is overridden to) the opened position, and receiving data provided by the at least one sensor when the engine speed is the second speed and the CBV is in (e.g., is overridden to) the closed position. The at least one sensor includes a turbo speed sensor, an inter-stage pressure sensor, and a charge pressure sensor; and wherein the first engine speed is 600 RPM (e.g., during an idle event) and the second engine speed is 2000 RPM.

In another embodiment of the present disclosure, a system includes a controller including a control signal generation unit, a parameter signal process unit, and failure mode isolation unit. In one example, the control signal generation unit is configured to provide control signals to actuate one or more valve actuators of an engine to a desired position; provide control signals to modify one or more operational parameters of the engine; and provide control signals to modify an operational mode of the engine. In another example, the parameter signal process unit is configured to receive parameter signals corresponding to at least one operational parameter of the engine; and receive parameter signals from at least one sensor coupled to the engine, wherein at least one sensor corresponds to a position of a valve. In yet another example, the failure mode isolation unit is configured to generate at least one fault code corresponding to one or more failure modes, and isolate a failure mode from the one or more failure modes in response to at least one of: modifying one or more operational parameters of the engine, modifying an operational mode of the engine, causing actuation of one or more valves to a desired position, receiving parameter signals corresponding to at least one of an operational parameter of the engine and a sensor coupled to the engine.

In one example, the controller is configured to generate data signals indicating at least one fault code wherein the at least one fault code indicates a potential failure of one or more engine components. For example, the one or more engine components include: a turbo speed sensor, an inter-stage pressure sensor, a charge pressure sensor, and a compressor by-pass valve position sensor, and wherein the one or more failure modes include: a turbo speed sensor in-range failure mode, an inter-stage pressure sensor failure mode, a charge pressure sensor in-range failure mode, a high speed turbo failure mode, and a compressor by-pass valve efficiency failure mode. In another example, the engine includes a compressor by-pass valve (CBV) moveable between an opened position and a closed position, wherein the parameter signal process unit is further configured to receive data signals provided by one or more sensors in response to the CBV moving to an opened position and receiving data provided by the one or more sensors in response to the CBV moving to a closed position.

Modifying at least one operational parameter of the engine includes increasing engine speed from a first engine speed to a second engine speed, wherein the parameter signal process unit is further configured to receive data signals provided by the one or more sensors when the engine speed is the first engine speed and the CBV is in the opened position and receive data signals provided by the one or more sensors when the engine speed is the first engine speed and the CBV is in the closed position. In one example, the parameter signal process unit is further configured to receive data signals provided by the one or more sensors when the engine speed is the second engine speed and the CBV is in the opened position and receive data signals provided by the one or more sensors when the engine speed is the second engine speed and the CBV is in the closed position. For example, the one or more sensors include a turbo speed sensor, an inter-stage pressure sensor (e.g., between the high pressure and low pressure turbo), and a charge pressure sensor; and wherein the first engine speed is 600 RPM and the second engine speed is 2000 RPM.

In another aspect of this embodiment, the failure mode isolation unit is further configured to monitor data signals corresponding to the charge pressure sensor and determine if the charge pressure exceeded a predetermined threshold charge pressure during a time period between when the CBV is in the opened position at the second engine speed and when the CBV is in the closed position at the second engine speed. Also, the failure mode isolation unit is further configured to monitor data signals corresponding to the turbo speed sensor and determine if the turbo speed is within a predetermined turbo speed range when the CBV is in the closed position at the second engine speed.

In another embodiment of the present disclosure, a system includes an engine having one or more valve actuators configured to actuate one or more valves to a desired position. Also included in the system is a controller coupled to the engine, the controller configured to generate at least one fault code corresponding to one or more failure modes and provide control signals to actuate one or more valve actuators, and an interface device communicably coupled to the controller wherein the interface device is configured to provide commands to the controller corresponding to a desired position of the one or more valves, provide commands to the controller wherein at least one of the commands causes the controller to modify at least one of: an operational parameter of the engine and a mode of operation of the engine, and receive one or more parameter signals corresponding to an operational parameter of the engine. In one example, the interface device includes a failure mode isolation unit configured to isolate a failure mode of one or more engine components from the one or more failure modes in response to actuating at least one valve, modifying the mode of operation of the engine, and modifying at least one operational parameter of the engine.

In one example, the one or more engine components include: a turbo speed sensor, an inter-stage pressure sensor, a charge pressure sensor, and a compressor by-pass valve position sensor, and wherein the failure mode includes: a turbo speed sensor in-range failure mode, an inter-stage pressure sensor failure mode, a charge pressure sensor in-range failure mode, a high speed turbo failure mode, and a compressor by-pass valve efficiency failure mode. For example, the engine includes a compressor by-pass valve (CBV) moveable between an opened position and a closed position, wherein the interface device is further configured to receive data signals corresponding to one or more sensors in response to the CBV moving to an opened position, and receive data signals corresponding to the one or more sensors in response to the CBV moving to a closed position.

In one example, modifying an operational parameter of the engine includes increasing engine speed from a first engine speed to a second engine speed, wherein the interface device is further configured to receive data signals corresponding to one or more sensors when the engine speed is the first engine speed and the CBV is in the opened position, and receive data signals corresponding to the one or more sensors when the engine speed is the first engine speed and the CBV is in the closed position. The interface device is further configured to receive data signals corresponding to the one or more sensors when the engine speed is the second engine speed and the CBV is in the opened position and receive data signals corresponding to the one or more sensors when the engine speed is the second engine speed and the CBV is in the closed position. The one or more sensors include a turbo speed sensor, an inter-stage pressure sensor, and a charge pressure sensor; and wherein the first engine speed is 600 RPM and the second engine speed is 2000 RPM.

In one example, the failure mode isolation unit is further configured to monitor data signals corresponding to the charge pressure sensor and determine if the charge pressure exceeded a predetermined threshold charge pressure between a time period when the CBV is in the opened position at the second engine speed and when the CBV is in the closed position at the second engine speed. The failure mode isolation unit is further configured to monitor data signals corresponding to the turbo speed sensor and determine if the turbo speed is within a predetermined turbo speed range when the CBV is in the closed position at the second engine speed. The interface device is configured to display data in real-time wherein the data corresponds to one or more operational parameters of the engine.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
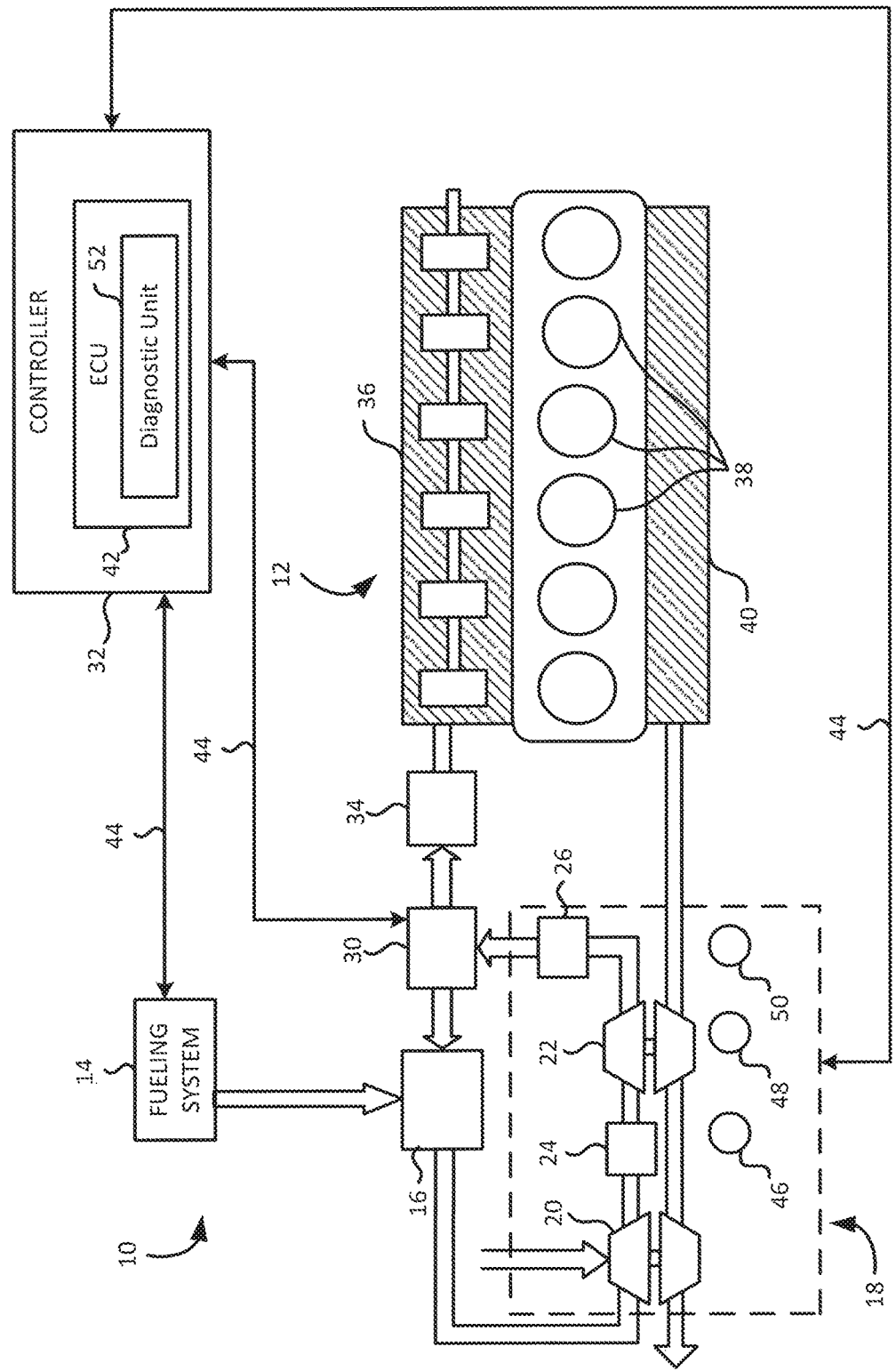
FIG. 1 is a schematic illustration of an exemplary internal combustion engine system having a diagnostic unit in accordance with embodiments of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF EMBODIMENTS

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

In one embodiment, a present system includes a controller having a control signal generation unit that provides control signals to actuate one or more valve actuators of an engine to a desired position, and control signals to modify one or more operational parameters and an operational mode of the engine. The present system and individual component diagnostic units are dependent on at least one engine sensors and/or actuator position sensor. To differentiate between the component error and the dependent sensor/actuator error, the present system generates at least one fault code corresponding to one or more failure modes. In some embodiments, all the possible failure modes are then manually checked by a service technician to correctly diagnose the failure mode.

For example, a failure mode isolation unit can be used by the service technician to isolate the failure mode from the one or more failure modes in response to modifying the operational parameters or the operational mode, causing actuation of the valves to a desired position, and receiving and processing the parameter signals from the sensors.

FIG. 1 shows an exemplary internal combustion engine system 10 of a vehicle including an engine 12, a fueling system 14 including a fuel mixer 16 to mix air with fuel and/or with a recirculated air/fuel mixture, and a charging subsystem 18 including a low pressure (LP) turbocharger 20 and a high pressure (HP) turbocharger 22, each turbocharger 20, 22 including a compressor driven by a turbine caused to rotate by flow of exhaust gas through its vanes, where the air/fuel mixture is densified by the compressors. An inter-air cooler 24 is positioned between HP turbocharger 22 and LP turbocharger 20 to cool the densified air/fuel mixture output from LP turbocharger 20. A charged-air cooler (CAC) 26 is provided downstream of and to cool the densified air/fuel mixture output from HP turbocharger 22. The densified air/fuel mixture discharged through CAC 26 is supplied to a compressor bypass valve (CBV) 30 which is operable in accordance with a bypass signal provided by a controller 32 to direct the densified air/fuel mixture, or any portion thereof, to a fuel metering assembly or throttle 34, or back to fuel mixer system 16 for mixing with fresh air and fuel. As used herein, "gas charge" refers to gases supplied to fuel metering assembly 34. Engine 12 includes intake manifold 36 receiving the gas charge from CBV 30, cylinders 38 to combust the gas charge, and exhaust manifold 40 receiving combustion gases from cylinders 38 and supplying the combusted gases to two-stage charging subsystem 18.

In FIG. 1, controller 32 includes an engine control unit (ECU) 42 operable to produce control signals on any one or more of signal paths 44 to control the operation of one or more corresponding suitably positioned engine components, such as fueling system 14, CBV 30, and charging subsystem 18. One or more air handling system components described above are controlled by ECU 42 for regulating operation of engine system 10. ECU 42 is in communication with a controller area network (CAN) or other serial bus systems for communicating with various components and sensors on engine 12 and/or within the vehicle. For example, a turbo speed sensor (TSPD) 46, an inter-stage pressure sensor (ISP) 48, and a charge pressure sensor (CHP) 50 are used to determine performance of charging subsystem 18. In this example, TSPD 46 monitors a turbo spinning speed of charging subsystem 18, ISP 48 monitors a ratio of an inter-stage air pressure between LP turbocharger 20 and HP turbocharger 22, and CHP 50 monitors a manifold turbo pressure of charging subsystem 18. Other air handling system components, such as an exhaust gas recirculation (EGR) valve, a variable geometry turbocharger turbine, an exhaust throttle, and/or a wastegate, and the like, are also controlled by ECU 42.

ECU 42 includes a diagnostic unit 52 configured for detecting a fault of an engine component based on at least one fault code corresponding to one or more failure modes by isolating a failure mode from the one or more failure modes. In one example, diagnostic unit 52 performs diagnostic steps to isolate faults/failures associated with any one or more of the air handling system components just described, as a function of a corresponding commanded actuator position and resulting actuator position, and further as a function of another engine/air handling system operating condition other than the resulting actuator position. Such a strategy allows for discrimination of the source of a detected fault/failure as between the actuator position sensor, the actuator, and the air handling system itself. Advantageously, the isolated failure mode prevents incorrect replacement of components in a service event, and misidentification of failed components for a proper initial repair. As such, only components identified by the isolated failure mode are replaced or serviced, thereby reducing maintenance time and expenses.

Figure 2:
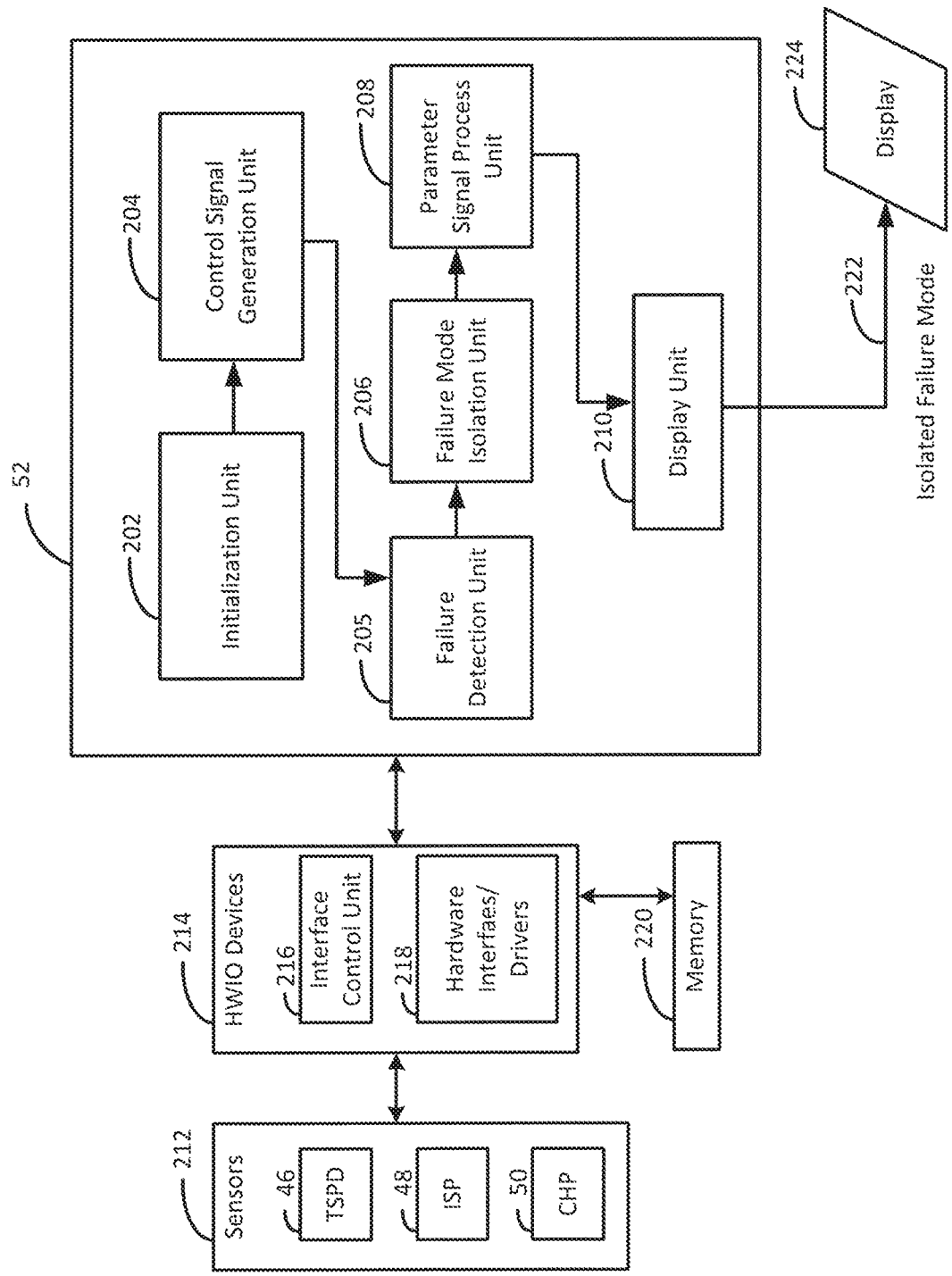
FIG. 2 is a functional block diagram of the diagnostic unit of FIG. 1 featuring related units and components associated with the diagnostic unit in accordance with embodiments of the present disclosure.

FIG. 2 shows an exemplary diagnostic unit 52 featuring its sub-units in accordance with embodiments of the present disclosure. In this example, diagnostic unit 52 includes an initialization unit 202, a control signal generation unit 204, a failure detection unit 205, a failure mode isolation unit 206, a parameter signal process unit 208, and a display unit 210. Initialization unit 202 receives signals from sensors 212 via hardware input/output (HWIO) devices 214. In one example, HWIO devices 214 include an interface control unit 216 and hardware interfaces/drivers 218. Interface control unit 216 provides an interface between the units 202-210, and hardware interfaces/drivers 218. Hardware interfaces/drivers 218 control operation of, for example, a camshaft phaser position sensor, a pressure sensor, an engine speed sensor, and other engine system components. Other engine system devices include ignition coils, spark plugs, throttle valves, solenoids, etc. Hardware interface/drivers 218 also receive sensor signals, which are communicated to the control unit, such as controller 32. Memory 220 is operatively coupled to HWIO devices 214 to store and retrieve operational data and parameters. Memory 220 can be part of ECU 42 or separate from ECU 42.

As another example, interface control unit 216 is communicably coupled to controller 32, and provides commands to controller 32 corresponding to a desired position of one or more valves, provides commands to controller 32 wherein at least one of the commands causes controller 32 to modify at least one of: an operational parameter of engine 12 and a mode of operation of engine 12, and receives one or more parameter signals corresponding to an operational parameter of engine 12. Interface control unit 216 includes failure mode isolation unit 206 which is configured to isolate a failure mode of one or more engine components from the one or more failure modes in response to actuating at least one valve, modifying the mode of operation of engine 12, and modifying at least one operational parameter of engine 12. Examples are described in greater detail below in paragraphs relating to FIGS. 3-5. Other combinations with sub-units 200-210 and interface control unit 216 are also contemplated to suit different applications.

In this example, sensors 212 include TSPD 46, ISP 48, and CHP 50, but other suitable sensors, such as a camshaft phaser position sensor or an engine speed sensor, are contemplated to suit different applications. Initialization unit 202 generates an initialization signal based on the signals from sensors 212 and determines whether to enable control signal generation unit 204 by verifying that various initialization conditions are met. For example, the initialization conditions include ensuring that the engine speed of the engine 12 is at a predetermined engine speed (e.g., 600 or 2000 RPM) and that the vehicle has been in a safe stationary position for a predetermined time period. When the initialization conditions are met, initialization unit 202 generates and transmits the initialization signal to control signal generation unit 204.

During operation, control signal generation unit 204 is configured to provide control signals to one or more valve actuators, such as the bypass signal for CBV 30, of engine 12 to actuate one or more valves associated with the actuators to a desired position. Further, control signal generation unit 204 is configured to provide control signals to modify one or more operational parameters of engine 12, and to provide control signals to modify an operational mode of engine. For example, control signal generation unit 204 provides an engine speed control signal to modify the engine speed of engine 12 from 600 RPM to 2000 RPM. In another example, control signal generation unit 204 provides an operation mode signal to modify the engine operation mode of engine 12 from an automated operation mode to a normal operation mode. In use, control signal generation unit 204 provides an override signal to suppress controls related to EGR or exhaust back-pressure valve (EBV) operations. Other control signals associated with engine 12 are also contemplated to suit different applications.

Parameter signal process unit 208 is configured to receive parameter signals corresponding to at least one operational parameter of engine 12. For example, parameter signal process unit 208 receives parameter signals associated with engine 12, such as a gear position signal, a coolant temperature signal, a battery voltage signal, a net torque signal, an exhaust pressure signal, and the like. In one example, parameter signal process unit 208 receives the parameter signals to prepare engine 12 in a predetermined diagnostic condition (e.g., starting engine 12 in an idle state at 600 RPM). Further, parameter signal process unit 208 receives parameter signals from at least one sensor coupled to engine 12, wherein the signal corresponds, for example, to a position of a valve. In other examples, parameter signal process unit 208 receives parameter signals associated with charging subsystem 18, such as a charge pressure signal, a turbo speed signal, and a CBV position signal.

Failure detection unit 205 is configured to generate at least one fault code corresponding to one or more failure modes, wherein the fault code indicates a potential failure of one or more engine components. In some embodiments, failure detection unit 205 is further configured to detect a failure corresponding to one or more failure modes and generate a fault code, while failure mode isolation unit 206 is configured to isolate the failure to one or more failed parts. The one or more engine components include: a turbo speed sensor, an inter-stage pressure sensor, a charge pressure sensor, and a compressor by-pass valve position sensor, and the one or more failure modes include: a turbo speed sensor in-range failure mode, an inter-stage pressure sensor failure mode, a charge pressure sensor in-range failure mode, a high speed turbo failure mode, and a compressor by-pass valve efficiency failure mode.

For example, in an air handling system, a first fault code having a numerical value of 686 indicates a turbo speed fault, a second fault code having a numerical value of 2973 indicates a charge pressure fault, a third fault code having a numerical value of 4683 indicates a CBV stuck open fault, and a fourth fault code having a numerical value of 4684 indicates a CBV stuck closed fault. In this example, these fault codes are related to one or more failure modes of engine 12, namely a turbo speed sensor in-range failure mode, an inter-stage pressure sensor in-rage failure mode, a charge pressure sensor in-range failure mode, and a CBV/high speed turbo efficiency failure mode. Conventionally, it is difficult to determine which failure mode is related to which fault code. However, as described further below, failure mode isolation unit 206 isolates a failure mode 222 from the one or more failure modes in response to at least one of: modifying one or more operational parameters of engine 12, modifying an operational mode of engine 12, causing actuation of one or more valves to a desired position, and receiving parameter signals corresponding to at least one of an operational parameter of engine 12 and a sensor (e.g., TSPD 46, ISP 48, and CHP 50) coupled to engine 12.

Display unit 210 is configured to output the isolated failure mode 222 for display, e.g., on a display device 224. For example, the isolated failure mode 222 is presented on a screen or printed on a paper for viewing in real-time, wherein the data related to the isolated failure mode 222 corresponds to the operational parameters of engine 12. Other suitable presentation methods are contemplated to suit the application.

Figure 3:
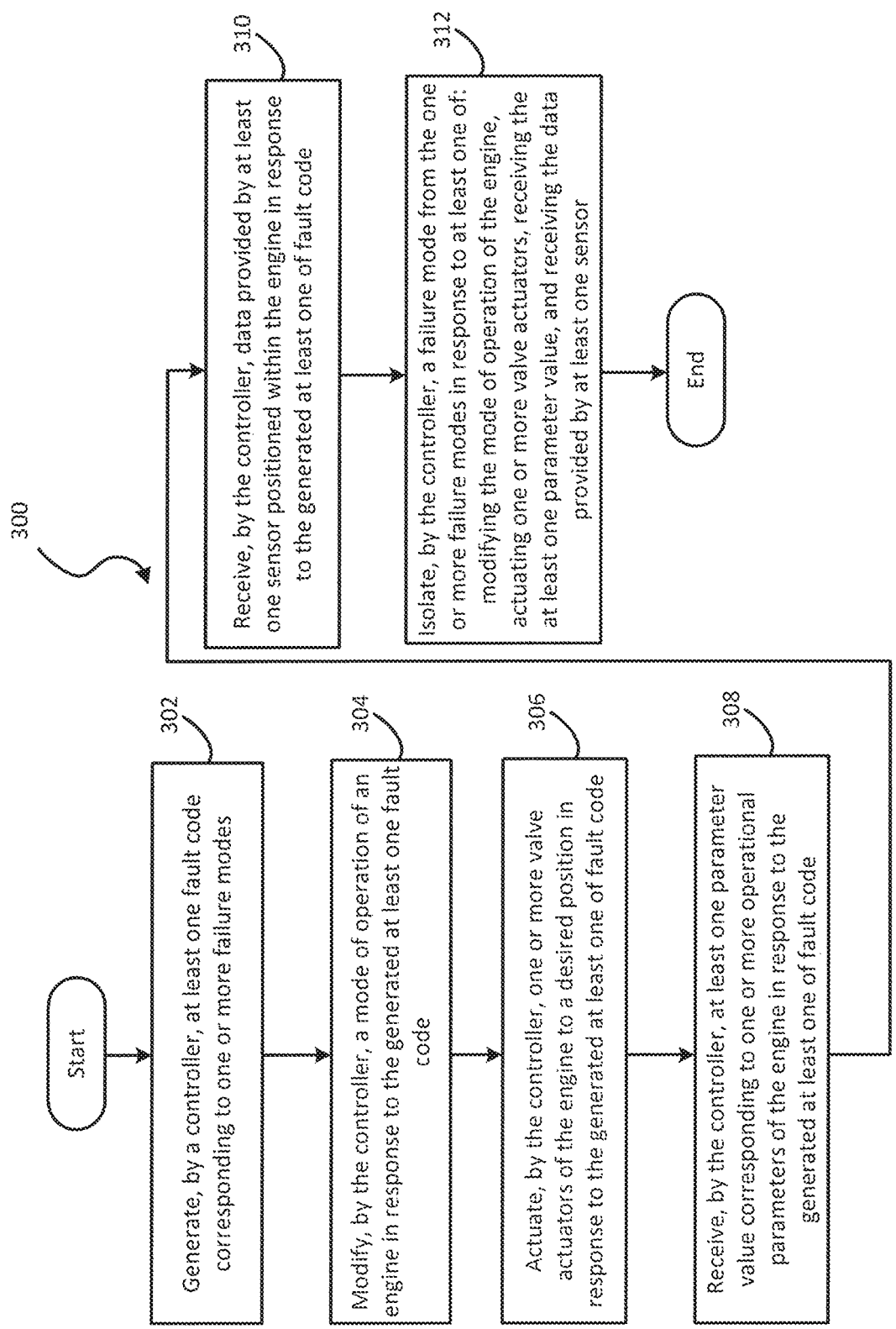
FIG. 3 is a flowchart illustrating one example of a method of isolating failure modes of a vehicle in accordance with embodiments of the present disclosure.

FIG. 3 shows an exemplary method of isolating a failure mode from one or more failure modes of a vehicle in accordance with embodiments of the present disclosure. It will be described with reference to FIGS. 1 and 2. However, any suitable structure can be employed. Although sub-blocks 302-312 are illustrated, other suitable sub-blocks can be employed to suit different applications. It should be understood that the blocks within the method can be modified and executed in a different order or sequence without altering the principles of the present disclosure.

In operation, at block 302, failure detection unit 205 generates at least one fault code corresponding to one or more failure modes. Exemplary fault codes include a turbo speed fault code, a charge pressure fault code, a compressor by-pass valve stuck open fault code, or a compressor by-pass valve stuck closed fault code. Exemplary failure modes include a turbo speed sensor in-range failure mode, an inter-stage pressure sensor failure mode, a charge pressure sensor in-range failure mode, a high speed turbo failure mode, or a compressor by-pass valve efficiency failure mode. As described above, when one or more of the fault codes 686, 2973, 4683, 4684 are generated by failure detection unit 205 during a diagnostic event, at least one of failure modes is related to the fault codes to indicate a potential failure of one or more engine components. In this example, the fault codes 686, 2973, 4683, and 4684 indicate the failure of the air handling system in one of sensors TSPD 46, ISP 48, and CHP 50, or CBV 30.

At block 304, failure mode isolation unit 206 modifies a mode of operation of engine 12 in response to the generated at least one fault code. Modifying the engine operation mode refers to operating engine 12 in a normal mode and then operating engine 12 in an abnormal mode. The normal mode refers to a normal driving condition where none of the operational parameters of engine 12 is overridden. The abnormal mode refers to an abnormal driving condition where at least one operational parameter of engine 12 is overridden for testing. For example, failure mode isolation unit 206 places engine 12 in a normal operation mode at an engine speed of 600 RPM without performing EGR or EBV operations such that engine 12 is placed in a condition for setting up a specific exhaust flow path with no EGR flow. As another example, failure mode isolation unit 206 places engine 12 in an abnormal operation mode by overriding the at least one operational parameter associated with one or more valve actuators or by modifying an engine speed of engine 12. In the abnormal operation mode, the operating parameters include values exhibiting an out-of-range characteristic of normal driving conditions (e.g., an out-of-mission mode). For example, in the abnormal operation mode, the testing is conducted only in a stationary, non-driving condition of the vehicle. At block 306, failure isolation unit 206 commands the control signal generation unit 204 to actuate one or more valve actuators of engine 12 to a desired position in response to the generated at least one of fault code. For example, control signal generation unit 204 generates a control signal to override CBV 30 to be fully opened to bypass the compressor and receive an intake air flow.

At block 308, parameter signal process unit 208 receives at least one parameter value corresponding to one or more operational parameters of engine 12 in response to the generated at least one of fault code. For example, parameter signal process unit 208 receives parameter values, such as RPMs, sensor pressures and actuator position in response to the generated fault codes 686, 2973, 4683, 4684. At block 310, parameter signal process unit 208 receives data provided by at least one sensor positioned within engine 12 in response to the generated at least one of fault code. For example, parameter signal process unit 208 receives a turbo speed from TSPD 46, or pressure values from ISP 48 and CHP 50 when one or more of the fault codes 686, 2973, 4683, 4684 are generated.

At block 312, failure mode isolation unit 206 isolates a failure mode from the one or more failure modes in response to at least one of: modifying the mode of operation of engine 12, actuating one or more valve actuators, such as CBV 30, receiving the at least one parameter value, and receiving the data provided by at least one sensor, such as TSPD 46, ISP 48, and CHP 50. During the diagnostic event, at least one operational parameter of engine 12 is modified in response to the generated at least one fault code. In this example, engine 12 is an internal combustion engine, an engine speed is modified by control signal generation unit 204 from 600 RPM to 2000 RPM, and failure mode isolation unit 206 compares one or more changes in the turbo speed and pressure values at two different engine speeds (e.g., 600 and 2000 RPMs) to detect the potential failure of one or more engine components. Exemplary isolation techniques are illustrated in paragraphs below relating to FIGS. 4 and 5.

Figure 4:
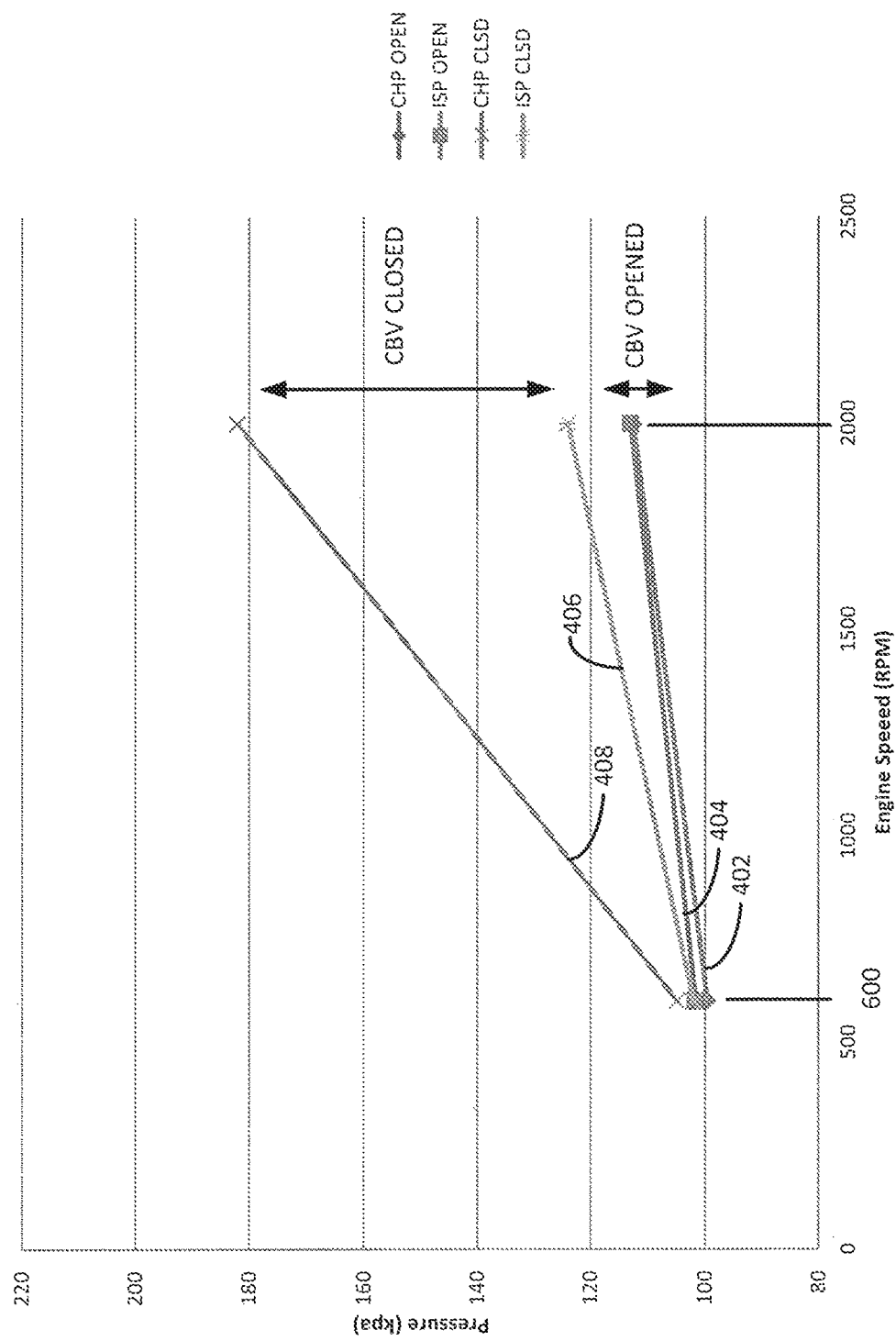
FIG. 4 is a graphical representation of one example of the method of isolating the failure modes related to an inter-stage pressure sensor and a charge pressure sensor in accordance with embodiments of the present disclosure.

FIG. 4 shows a first example of isolating the failure modes related to ISP 48 and/or CHP 50. In FIG. 4, parameter signal process unit 208 receives data provided by ISP 48 and/or CHP 50 in response to CBV 30 being moved to an opened position. Similarly, parameter signal process unit 208 receives data provided by ISP 48 and/or CHP 50 in response to CBV 30 being moved to a closed position. In this example, control signal generation unit 204 increases an engine speed from a first engine speed (e.g., 600 RPM) to a second engine speed (e.g., 2000 RPM). As discussed above, sensors 212 include a turbo speed sensor (TSPD) 46, an inter-stage pressure sensor (ISP) 48, and a charge pressure sensor (CHP) 50.

In FIG. 4, parameter signal process unit 208 receives data (e.g., pressure) provided by ISP 48 and/or CHP 50 when the engine speed is at 600 RPM and CBV 30 is in the opened position, and receives data provided by ISP 48 and/or CHP 50 when the engine speed is at 600 RPM and CBV 30 is in the closed position. Similarly, parameter signal process unit 208 receives data provided by ISP 48 and/or CHP 50 when the engine speed is at 2000 RPM and CBV 30 is in the opened position, and receives data provided by ISP 48 and/or CHP 50 when the engine speed is at 2000 RPM and CBV 30 is in the closed position. FIG. 4 represents an exemplary reference graph having parameter values and data received by parameter signal process unit 208 when the parameter values and data are provided by faultless sensors, such as ISP 48 and CHP 50, in response to CBV 30 moving between an opened position and a closed position.

In this example, a first line segment 402 indicates a faultless CHP 50 having a beginning pressure value of approximately 100 kilopascal (kPa) at 600 RPM and an ending pressure value of approximately 118 kPa at 2000 RPM, when CBV 30 is in the opened position. A second line segment 404 indicates a faultless ISP 48 having a beginning pressure value of approximately 102 kPa at 600 RPM and an ending pressure value of approximately 119 kPa, when CBV 30 is in the opened position. A third line segment 406 indicates a faultless CHP 50 having a beginning pressure value of approximately 102 kPa at 600 RPM and an ending pressure value of 122 kPa at 2000 RPM, when CBV 30 is in the closed position. A fourth line segment 408 indicates a faultless ISP 48 having a beginning pressure value of approximately 103 kPa and an ending pressure value of approximately 181 kPa, when CBV 30 is in the closed position.

At least one of a turbo speed sensor in-range failure mode, an inter-stage pressure sensor failure mode, a charge pressure sensor in-range failure mode, a high speed turbo failure mode, or a compressor by-pass valve efficiency failure mode can be isolated based on detection of a deviation from the pressure values shown in FIG. 4, indicating a faulty engine component. For example, failure mode isolation unit 206 monitors data signals, such as parameter values and data provided by sensors 212 (e.g., corresponding to CHP 50 and/or ISP 48) and determines if the charge pressure value exceeds a predetermined threshold charge pressure during a predetermined time period between when CBV 30 is in the opened position at the second engine speed and when CBV 30 is in the closed position at the second engine speed. In this example, pressure values for ISP 48 and CHP 50 should be nearly identical (e.g., line segments 402 and 404) between 600 RPM and 2000 RPM when CBV 30 is opened. However, if the pressure value of CHP 50 is greater than the one of ISP 48 by 7 kPa, a possible CBV stuck or partially stuck closed condition is suspected.

Failure mode isolation unit 206 is further configured to perform two checks. First check is to monitor data signals corresponding to the charge pressure sensor and determine if the charge pressure exceeded a predetermined threshold charge pressure during a time period between when CBV 30 is in the opened position at the second engine speed and when CBV 30 is in the closed position at the second engine speed. Second check is to monitor data signals corresponding to the turbo speed sensor and determine if the turbo speed is within a predetermined turbo speed range when CBV 30 is in the closed position at the second engine speed. Based on a condition whether at least one of first and second checks passes or fails, one of three different actions described below is performed.

As an example only, first action refers to if both first and second check pass, and there is a pre-existing fault code, then inter-stage pressure sensor 48 is the possible failed part. A service technician is guided to check inter-stage pressure sensor 48, and replace it as needed. Road testing is required to validate the replacement fixes the problem and no fault codes turn on. Second action refers to if first check passes and second check fails, then turbo speed sensor 46 is the failed part. The service technician is guided to check turbo speed sensor 46 and replace it as needed. The failure mode isolation unit test is repeated. Third action refers to if first check fails, then second check does not matter. In this case, there are three possible failed parts, charge pressure sensor 50, compressor by-pass valve 30 or high pressure turbo. For example, the service technician is guided to replace charge pressure sensor 50 and repeat the failure mode isolation unit test. If first check fails again after replacing the charge pressure sensor, then compressor bypass valve 50 or high pressure turbo needs to be inspected and replaced it as needed.

Figure 5:
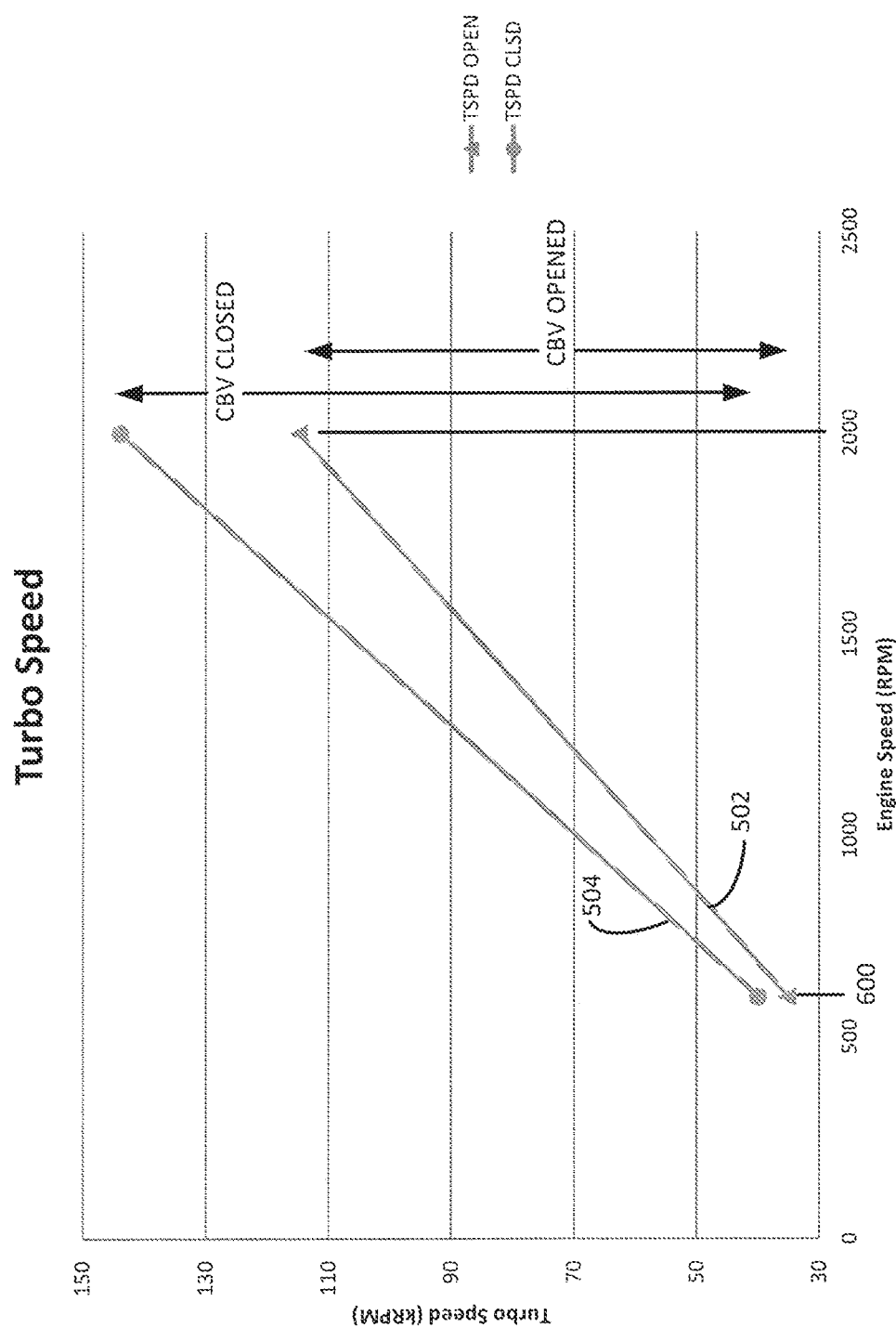
FIG. 5 is a graphical representation of another example of the method of isolating the failure modes related to a turbo speed sensor in accordance with embodiments of the present disclosure.

FIG. 5 shows a second example of isolating the failure modes related to TSPD 46. In FIG. 5, parameter signal process unit 208 receives data provided by TSPD 46 in response to CBV 30 being moved to an opened position. Similarly, parameter signal process unit 208 receives data provided by TSPD 46 in response to CBV 30 being moved to a closed position. As similarly shown in FIG. 4, control signal generation unit 204 increases an engine speed from a first engine speed (e.g., 600 RPM) to a second engine speed (e.g., 2000 RPM).

In FIG. 5, parameter signal process unit 208 receives data (e.g., turbo speed) provided by TSPD 46 when the engine speed is at 600 RPM and CBV 30 is in the opened position, and receives data provided by TSPD 46 when the engine speed is at 600 RPM and CBV 30 is in the closed position. Similarly, parameter signal process unit 208 receives data provided by TSPD 46 when the engine speed is at 2000 RPM and CBV 30 is in the opened position, and receives data provided by TSPD 46 when the engine speed is at 2000 RPM and CBV 30 is in the closed position. FIG. 5 represents an exemplary reference graph having parameter values and data received by parameter signal process unit 208 when the parameter values and data are provided by faultless sensors, such as TSPD 46, in response to CBV 30 moving between an opened position and a closed position.

In this example, a first line segment 502 indicates a faultless TSPD 46 having a beginning turbo speed of approximately 32 kiloRPM (kRPM) at 600 RPM engine speed and an ending turbo speed of approximately 112 kRPM at 2000 RPM engine speed, when CBV 30 is in the opened position. A second line segment 504 indicates a faultless TSPD 46 having a beginning turbo speed of approximately 33 kRPM at 600 RPM engine speed and an ending turbo speed of approximately 148 kRPM, when CBV 30 is in the closed position.

Again, at least one of a turbo speed sensor in-range failure mode, an inter-stage pressure sensor failure mode, a charge pressure sensor in-range failure mode, a high speed turbo failure mode, or a compressor by-pass valve efficiency failure mode can be isolated based on a deviation from the turbo speeds shown in FIG. 5, indicating a faulty engine component. For example, failure mode isolation unit 206 monitors data signals, such as parameter values and data provided by sensors 212 (e.g., corresponding to TSPD 46) and determines if the turbo speed is within a predetermined turbo speed range when CBV 30 is in the closed position at the second engine speed. When no deviation is detected based on values shown in FIGS. 4 and 5, TSPD 46, ISP 48, and CHP 50 are presumed operating appropriately, and thus a faulty CBV 30 is suspected. As a result, in this example, the compressor by-pass valve efficiency failure mode is isolated by failure mode isolation unit 206.

As an example only, if CHP 50 and TSPD 46 are both above the predetermined levels when CBV 30 is closed at the second engine speed of 2000 RPM, and a fault code exists, then inter-stage pressure sensor 46 is faulty. If CHP 50 is above the predetermined level and TSPD 46 is not above the predetermined level when CBV 30 is closed at the second engine speed of 2000 RPM, then turbo speed sensor 46 is faulty. If CHP 50 is not above the predetermined levels with CBV 30 closed at the second engine speed of 2000 RPM, then CHP 50, CBV 30 or high power turbo could be faulty. Failure mode isolation unit 206 then instructs the service technician to replace CHP 50 and repeat the failure mode isolation unit 206 test. If CHP 50 is still not above the predetermined levels with CBV 30 closed at the second engine speed of 2000 RPM, then failure is isolated to either CBV or high pressure (HP) turbo.

Embodiments of the present disclosure are described below by way of example only, with reference to the accompanying drawings. Further, the following description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

Furthermore, while the above description describes hardware in the form of a processor executing code, hardware in the form of a state machine, or dedicated logic capable of producing the same effect, other structures are also contemplated. Although the sub-units 202-210 are illustrated as children units subordinate of the parent unit 52, each sub-unit can be operated as a separate unit from ECU 42, and other suitable combinations of sub-units are contemplated to suit different applications. Also, although the units 202-210 are illustratively depicted as separate units, the functions and capabilities of each unit can be implemented, combined, and used in conjunction with/into any unit or any combination of units to suit different applications. For example, in some embodiments, the sub-units 206 and 208 are disposed on an external server or another suitable computing device, such as a laptop or a mobile device, to facilitate easy mobility of the present system. In this configuration, the sub-units 206 and 208 are separated from the parent unit 52, and independently executed by the server or computing device. Other suitable combinations of the sub-units 202-210 are also contemplated depending on different applications.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the present disclosure should, therefore, be determined with reference to the appended claims, along with the full scope of equivalents to which such claims are entitled.

What is claimed is:

1. A method comprising:
   generating, by a controller, at least one fault code corresponding to one or more failure modes;
   modifying, by the controller, a mode of operation of an engine in response to the generated at least one fault code;
   actuating, by the controller, one or more valve actuators of the engine to a desired position in response to the generated at least one of fault code;
   receiving, by the controller, at least one parameter value corresponding to one or more operational parameters of the engine in response to the generated at least one of fault code;
   receiving, by the controller, data provided by at least one sensor positioned within the engine in response to the generated at least one of fault code; and
   isolating, by the controller, a failure mode from the one or more failure modes in response to at least one of: modifying the mode of operation of the engine, actuating one or more valve actuators, receiving the at least one parameter value, and receiving the data provided by the at least one sensor.

2. The method of claim 1, wherein generating at least one fault code includes generating one of: a turbo speed fault code, a charge pressure fault code, an inter-stage pressure fault code, a compressor by-pass valve stuck open fault code, and a compressor by-pass valve stuck closed fault code.

3. The method of claim 1, wherein the one or more failure modes include: a turbo speed sensor in-range failure mode, an inter-stage pressure sensor failure mode, a charge pressure sensor in-range failure mode, a high speed turbo failure mode, a high pressure turbo failure mode and a compressor by-pass valve efficiency failure mode.

4. The method of claim 1, wherein modifying a mode of operation of an engine includes operating the engine in a normal mode and then operating the engine in an abnormal mode.

5. The method of claim 1, further including modifying at least one operational parameter of the engine in response to the generated at least one fault code, wherein the engine is an internal combustion engine and modifying at least one operational parameter of the engine includes modifying an engine speed of the internal combustion engine.

6. The method of claim 1, further including receiving data provided by the at least one sensor in response to a compressor by-pass valve ("CBV") being moved to an opened position and receiving data provided by the at least one sensor in response to the CBV being moved to a closed position.

7. The method of claim 5, wherein modifying at least one operational parameter of the engine includes increasing the engine speed from a first engine speed to a second engine speed.

8. The method of claim 7, further including receiving data provided by the at least one sensor when the engine speed is the first engine speed and the CBV is in the opened position, and receiving data provided by the at least one sensor when the engine speed is the first engine speed and the CBV is in the closed position.

9. The method of claim 7, further including receiving data provided by the at least one sensor when the engine speed is the second engine speed and the CBV is in the opened position, and receiving data provided by the at least one sensor when the engine speed is the second speed and the CBV is in the closed position.

10. The method of claim 9, wherein the at least one sensor includes a turbo speed sensor, an inter-stage pressure sensor, and a charge pressure sensor; and wherein the first engine speed is 600 RPM and the second engine speed is 2000 RPM.

11. A system comprising:
    a controller including a control signal generation unit, a parameter signal process unit, and a failure mode isolation unit;
    the control signal generation unit configured to:
       provide control signals to actuate one or more valve actuators of an engine to a desired position;
       provide control signals to modify one or more operational parameters of the engine; and provide control signals to modify an operational mode of the engine;

the parameter signal process unit configured to:
receive parameter signals corresponding to at least one operational parameter of the engine; and
receive parameter signals from at least one sensor coupled to the engine, wherein the at least one sensor corresponds to a position of a valve;

the failure detection unit configured to generate at least one fault code corresponding to one or more failure modes; and the failure mode isolation unit configured to isolate a failure mode from the one or more failure modes in response to at least one of: modifying one or more operational parameters of the engine, modifying an operational mode of the engine, causing actuation of one or more valves to a desired position, receiving parameter signals corresponding to at least one of an operational parameter of the engine and the at least one sensor.

12. The system of claim 11, wherein the controller is configured to generate data signals indicating at least one fault code wherein the at least one fault code indicates a potential failure of one or more engine components.

13. The system of claim 12, wherein the one or more engine components include: a turbo speed sensor, an inter-stage pressure sensor, a charge pressure sensor, and a compressor by-pass valve position sensor, and wherein the one or more failure modes include: a turbo speed sensor in-range failure mode, an inter-stage pressure sensor failure mode, a charge pressure sensor in-range failure mode, a high speed turbo failure mode, and a compressor by-pass valve efficiency failure mode.

14. The system of claim 11, wherein the engine includes a compressor by-pass valve (CBV) moveable between an opened position and a closed position, wherein the parameter signal process unit is further configured to receive data signals provided by one or more sensors in response to the CBV moving to an opened position and receiving data provided by the one or more sensors in response to the CBV moving to a closed position.

15. The system of claim 14, wherein modifying at least one operational parameter of the engine includes increasing engine speed from a first engine speed to a second engine speed, wherein the parameter signal process unit is further configured to:
receive data signals provided by the one or more sensors when the engine speed is the first engine speed and the CBV is in the opened position and
receive data signals provided by the one or more sensors when the engine speed is the first engine speed and the CBV is in the closed position.

16. The system of claim 15, wherein the parameter signal process unit is further configured to:
receive data signals provided by the one or more sensors when the engine speed is the second engine speed and the CBV is in the opened position; and
receive data signals provided by the one or more sensors when the engine speed is the second engine speed and the CBV is in the closed position.

17. The system of claim 16, wherein the one or more sensors include a turbo speed sensor, an inter-stage pressure sensor, and a charge pressure sensor; and wherein the first engine speed is 600 RPM and the second engine speed is 2000 RPM.

18. The system of claim 17, wherein the failure mode isolation unit is further configured to monitor data signals corresponding to the charge pressure sensor and determine if the charge pressure exceeded a predetermined threshold charge pressure during a time period between when the CBV is in the opened position at the second engine speed and when the CBV is in the closed position at the second engine speed.

19. The system of claim 17, wherein the failure mode isolation unit is further configured to monitor data signals corresponding to the turbo speed sensor and determines if the turbo speed is within a predetermined turbo speed range when the CBV is in the closed position at the second engine speed.

20. A system comprising:
an engine having one or more valve actuators configured to actuate one or more valves to a desired position;
a controller coupled to the engine, the controller configured to generate at least one fault code corresponding to one or more failure modes and provide control signals to actuate the one or more valve actuators; and
an interface device communicably coupled to the controller wherein the interface device is configured to:
provide commands to the controller corresponding to a desired position of the one or more valves,
provide commands to the controller wherein at least one of the commands causes the controller to modify at least one of: an operational parameter of the engine and a mode of operation of the engine, and
receive one or more parameter signals corresponding to an operational parameter of the engine;
the interface device including a failure mode isolation unit configured to isolate a failure mode of one or more engine components from the one or more failure modes in response to actuating at least one valve, modifying the mode of operation of the engine, and modifying at least one operational parameter of the engine.

21. The system of claim 20, wherein the one or more engine components include: a turbo speed sensor, an inter-stage pressure sensor, a charge pressure sensor, and a compressor by-pass valve position sensor, and wherein the failure mode includes: a turbo speed sensor in-range failure mode, an inter-stage pressure sensor failure mode, a charge pressure sensor in-range failure mode, a high speed turbo failure mode, and a compressor by-pass valve efficiency failure mode.

22. The system of claim 20, wherein the engine includes a compressor by-pass valve (CBV) moveable between an opened position and a closed position, wherein the interface device is further configured to:
receive data signals corresponding to one or more sensors in response to the CBV moving to an opened position, and
receive data signals corresponding to the one or more sensors in response to the CBV moving to a closed position.

23. The system of claim 20, wherein modifying an operational parameter of the engine includes increasing engine speed from a first engine speed to a second engine speed, wherein the interface device is further configured to:
receive data signals corresponding to one or more sensors when the engine speed is the first engine speed and the CBV is in the opened position; and
receive data signals corresponding to the one or more sensors when the engine speed is the first engine speed and the CBV is in the closed position.

24. The system of claim 23, wherein the interface device is further configured to:

receive data signals corresponding to the one or more sensors when the engine speed is the second engine speed and the CBV is in the opened position; and receive data signals corresponding to the one or more sensors when the engine speed is the second engine speed and the CBV is in the closed position.

25. The system of claim 24, wherein the one or more sensors include a turbo speed sensor, an inter-stage pressure sensor, and a charge pressure sensor; and wherein the first engine speed is 600 RPM and the second engine speed is 2000 RPM.

26. The system of claim 25, wherein the failure mode isolation unit is further configured to monitor data signals corresponding to the charge pressure sensor and determine if the charge pressure exceeded a predetermined threshold charge pressure between a time period when the CBV is in the opened position at the second engine speed and when the CBV is in the closed position at the second engine speed.

27. The system of claim 25, wherein the failure mode isolation unit is further configured to monitor data signals corresponding to the turbo speed sensor and determines if the turbo speed is within a predetermined turbo speed range when the CBV is in the closed position at the second engine speed.

28. The system of claim 20, wherein the interface device is configured to display data in real-time wherein the data corresponds to one or more operational parameters of the engine.

* * * * *